United States Patent [19]

Crowell et al.

[11] Patent Number: 5,401,919
[45] Date of Patent: Mar. 28, 1995

[54] REMOVABLE PISTON BORE LINER FOR HYDRAULICALLY ACTUATED SEISMIC VIBRATOR

[75] Inventors: John M. Crowell, Friendswood; James E. Teske, Santa Fe, both of Tex.

[73] Assignee: Western Atlas International, Inc., Houston, Tex.

[21] Appl. No.: 248,626

[22] Filed: May 24, 1994

Related U.S. Application Data

[63] Continuation of Ser. No. 989,835, Dec. 14, 1992, abandoned.

[51] Int. Cl.$^6$ ............................................. G01V 1/04
[52] U.S. Cl. ..................................... 181/121; 367/189
[58] Field of Search ................ 367/189; 181/113, 114, 181/121

[56] References Cited

U.S. PATENT DOCUMENTS

| | | | |
|---|---|---|---|
| 4,253,538 | 3/1981 | Weber et al. | 181/119 |
| 4,664,222 | 5/1987 | Jones et al. | 181/113 |
| 4,682,669 | 7/1987 | Weber | 181/114 |
| 4,709,362 | 11/1987 | Cole | 367/189 |
| 4,718,049 | 1/1988 | Crowell et al. | 367/189 |
| 4,785,431 | 11/1988 | Myers | 367/189 |
| 4,805,725 | 2/1989 | Paulsson | 181/106 |
| 4,922,473 | 5/1990 | Sallas et al. | 367/189 |

Primary Examiner—Ian J. Lobo
Attorney, Agent, or Firm—Fish & Richardson

[57] ABSTRACT

A removable bore liner is provided that substantially increases the dependability, flexibility and field-serviceability of seismic vibrators and other hydraulically actuated devices. A method for installing the removable bore liner in a seismic vibrator is also provided.

10 Claims, 4 Drawing Sheets

REMOVABLE PISTON BORE LINER FOR HYDRAULICALLY ACTUATED SEISMIC VIBRATOR

This is a continuation of application Ser. No. 07/989,835, filed Dec. 14,1992, now abandoned.

BACKGROUND OF THE INVENTION

1. Field of the Invention

The present invention relates generally to the field of seismic exploration, and more particularly to a seismic vibrator utilizing a hydraulic actuator with a replaceable piston bore liner.

2. Discussion of the Related Art

Typically, seismic exploration involves imparting shock waves, or vibrations, into geologic formations and monitoring the reflected portion of shock waves passing through differing strata in the formations. The reflected shock waves are used to estimate the depth, shape, and composition of differing strata within a formation. Hydraulic actuators are used extensively to generate the shock waves, or vibrations, used in seismic exploration.

Because the world's known supply of hydrocarbon-based fuel continues to dwindle, seismic exploration is pursued in increasingly remote areas thought to contain untapped hydrocarbon deposits. The equipment used to conduct seismic exploration in these remote areas must be dependable and versatile. Further, any problems or breakages experienced by this equipment should be serviceable in the field. Unfortunately, present day seismic vibrators suffer from limited versatility and limited field serviceability. The present invention increases the versatility and field-serviceability of seismic vibrators.

Seismic energy (or shock waves) necessary for seismic exploration is commonly generated in a controlled sweep of frequencies—typically varying from around 10 Hz to 120 Hz. Four to six seismic vibrators may be used for two-dimensional surveys and eight to twelve seismic vibrators may be used for three-dimensional surveys. Seismic energy is imparted to the formation through a base plate attached to the lower end of a vertically disposed, dual acting hydraulic actuator. The force creating the seismic shock wave is generated by hydraulic pressure reacting against the actuator piston and a substantial mass (or mass block). The mass block typically weighs from six to eight thousand pounds and most often forms the body of the hydraulic actuator.

The rigors of seismic exploration often result in mechanical failures. For example, piston rings are known to fail. If a piston ring breaks in a present day seismic vibrator, the piston bore wall is often irreparably damaged. Some prior art hydraulic actuators used as vibrators contain piston bore liners; others do not. If the vibrator has no piston bore liner, the seismic vibrator must be removed from the exploration field to a facility capable of machining the damaged area from the mass block bore. Furthermore, the mass block bore must typically be further expanded, by mechanical removal of mass block material, to accommodate installation of a permanent piston bore liner.

Alternatively, if the vibrator has a conventional piston bore liner, the vibrator must still be removed from the field to a facility capable of machining the damaged piston bore liner from the mass block. Prior art piston bore liners are pressed into the mass block bore as either a shrink fit or interference fit. Either method results in "permanent" engagement of the bore liner with the mass block. In sum, damage to the piston bore in a prior art seismic vibrator requires transporting the vibrator from the exploration site for repair. Transportation of damaged vibrators from exploration sites increases repair costs and delay.

Furthermore, conventional seismic vibrators can typically only generate a fixed peak force. The nominal force imparted to a formation by an actuator is a function of hydraulic pressure and piston surface area. Conventional seismic vibrators operate at constant fluid pressure—typically 3,000 p.s.i. Variation from this constant pressure to change the generated force is not readily achieved, nor accepted, by those in the seismic exploration field. The amount of force generated can also be changed by varying the surface area of the piston. However, this solution requires an inventory of conventional seismic vibrators of varying piston size.

Also, during a typical frequency sweep, many conventional seismic vibrators experience a problem with the inherent spring or bulk modulus of elasticity of the hydraulic fluid used to drive the piston. At high frequency, this fluid spring often creates undesirable harmonics within the vibrator. The undesirable harmonics can be reduced or eliminated by reducing the volume of fluid driving the actuator piston. U.S. Pat. No. 4,785,431 discloses reducing this volume by mechanically increasing the distance between the opposing faces of the piston. U.S. Pat. No. 4,785,431 discloses that others have reduced fluid volume by moving end sleeves or cylinder heads.

The present invention provides a seismic vibrator that overcomes these and other problems found in conventional seismic exploration vibrators.

SUMMARY OF THE INVENTION

In accordance with the present invention, a removable bore liner for use with hydraulic actuator of the type commonly used in seismic vibrators and other like equipment is provided.

In one embodiment of the present invention, a hydraulic actuator comprises an actuator body with a substantially cylindrical wall therein that defines a bore. A removable, tubular liner is located adjacent the cylinder wall. The liner has a substantially smooth inside diameter surface that forms the wall of a chamber. At least one conduit provides communication of pressurized fluid into the chamber. A piston is located in the chamber and is sealed against the substantially smooth inside diameter surface of the removable bore liner. The piston is capable of relative axial movement within the chamber in response to differential pressurization of the chamber.

In another embodiment of the present invention, a vibrator assembly that forms a part of a seismic vibrator for imparting seismic energy into a geologic formation comprises a mass block having a substantially cylindrical wall therein that defines a bore. A first bushing has a cylindrical outer wall of a diameter slightly smaller than the bore of the mass block. The first bushing has a first end that is adapted to be fixedly connected to the mass block. The first bushing also has a cylindrical wall therein that defines a bore. A second bushing has a cylindrical outer wall of a diameter slightly smaller than the bore of the mass block. The second bushing has a first end that is adapted to be fixedly connected to said mass block. The second bushing also has a cylindrical wall therein that defines a bore. A removable, tubular liner is located adjacent the bore of the mass block and between a second end of the first bushing and a second end of the second bushing. The removable bore liner has a substantially smooth inside diameter surface that defines a chamber wall. The second ends of the first and the second bushings substantially define the ends of the chamber. A piston is located in the chamber in fluid tight engagement with the substantially smooth inside diameter surface of the removable bore liner. The piston has a first rod passing through the bore of said first bushing and a second rod passing through the bore of said second bushing in substantially fluid tight arrangement. The piston divides the chamber into at least two fluid compartments. A fluid conduit communicates pressurized fluid into the fluid compartments thereby differentially pressurizing one of the compartments with respect to the other compartment.

In a still further embodiment of the present invention, a method is provided for assembling a hydraulic actuator with a removable bore liner comprising the steps of providing a hydraulic actuator body that has a cylindrical wall therein that defines a bore. Assembling a removable, tubular bore liner around a piston in fluid tight arrangement so that a liner/piston assembly is formed. Placing the liner/piston assembly in the bore. Assembling a first bushing in the bore such that a first end of the first bushing is adjacent a first end of the removable bore liner. A first rod associated with the piston extends through the first bushing. The first bushing is connected to the hydraulic actuator body.

BRIEF DESCRIPTION OF THE DRAWING

For detailed understanding of the present invention, reference should be made to the following detailed description of the preferred embodiment, taken in conjunction with the accompanying drawings, in which like elements have been given like numerals, and wherein.

DETAILED DESCRIPTION OF THE PREFERRED EMBODIMENT

While this invention is susceptible of embodiment in many different forms, there is shown in the drawings and described in detail herein a preferred embodiment. The present disclosure is intended to be an exemplification of the principles of the invention, generally, and the preferred embodiment, specifically, and should not be construed to limit the invention to the embodiments illustrated.

Figure 1:
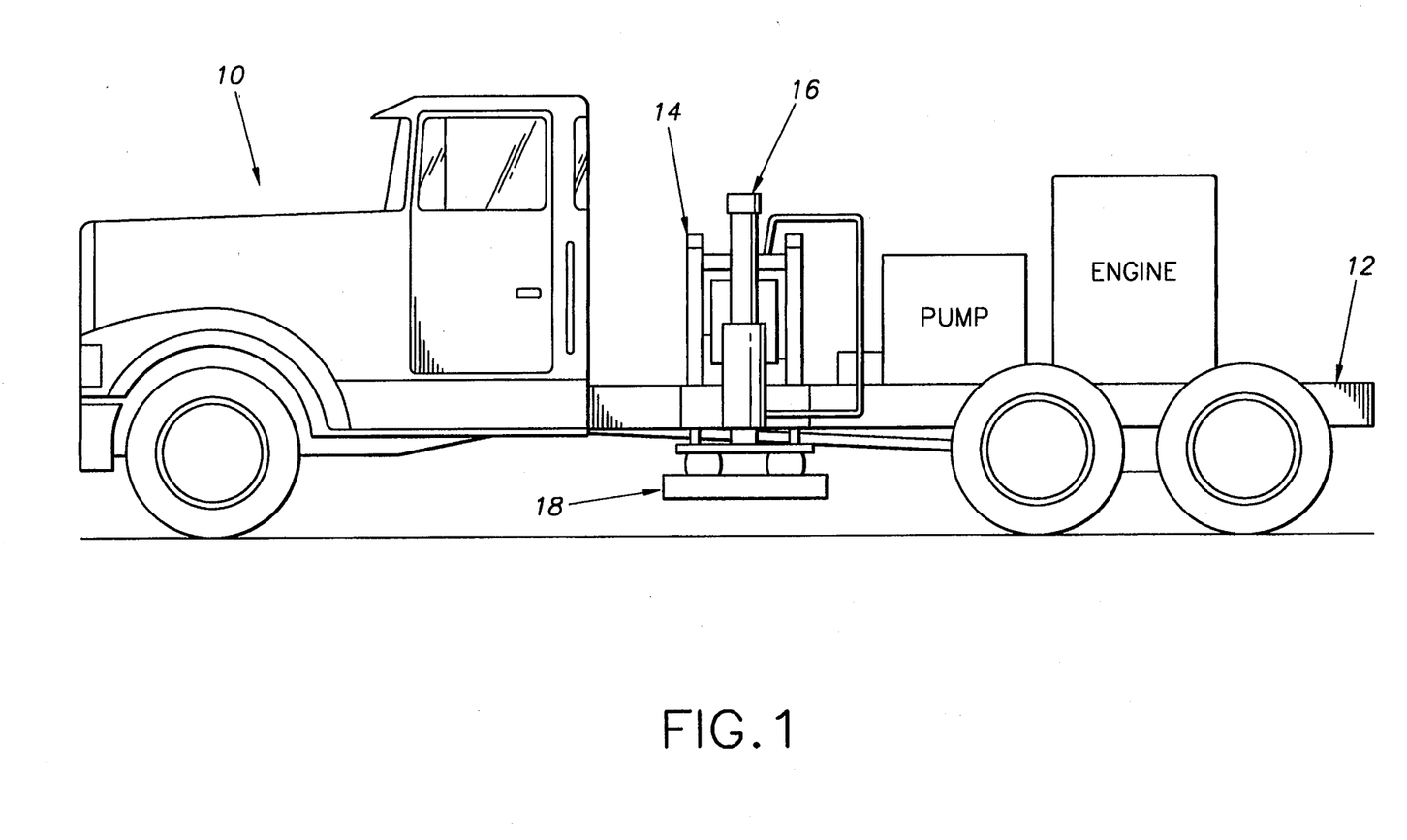
FIG. 1 is an elevational view of a conventional seismic vibrator.

FIG. 1 is a side view of a conventional seismic vibrator comprising a vehicle 10 such as a truck including a chassis 12 having a vibrator assembly 14 centrally mounted thereon. Hydraulic jacks and columns 16 raise and lower the vibrator assembly with respect to the truck, allowing the base plate 18 to engage the surface of a formation.

Figure 2:
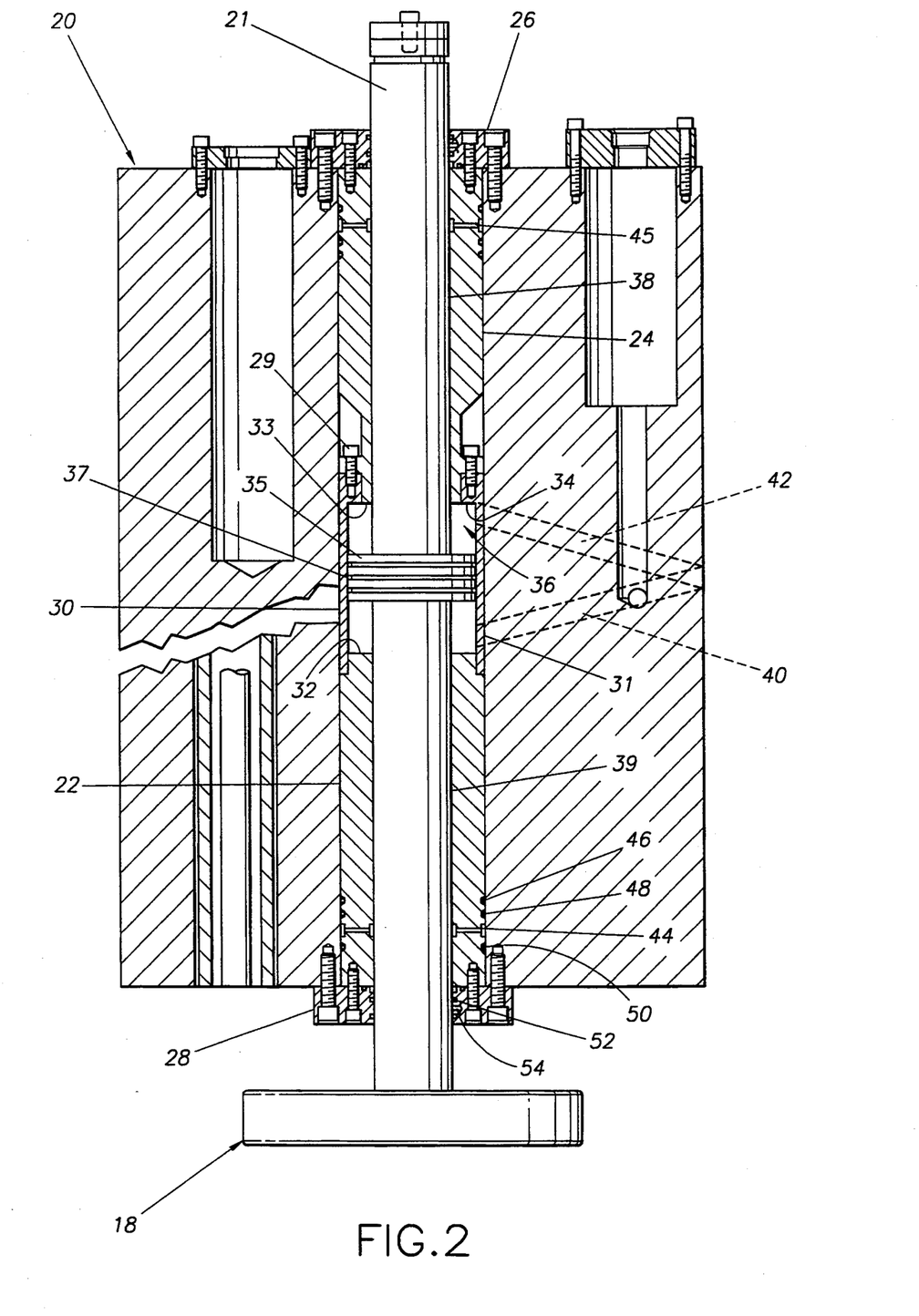
FIG. 2 is an elevational view in cross section of a hydraulic actuator with a removable piston bore liner according to the present invention.

FIG. 2 is a cross sectional view of a hydraulic actuator from a vibrator assembly embodying the present invention. A mass block 20 forms the body of the hydraulic actuator. The mass block 20 has a bore 21 centrally disposed along a vertical axis. In the preferred embodiment, the bore 21 is cylindrical. Those of ordinary skill in the art will recognize that the invention can be practiced using non-cylindrical bores. For example, a substantially cylindrical bore can advantageously incorporate a tongue or groove to maintain the radial alignment of the structures contacting the bore 21. Those of ordinary skill in the art will recognize that the invention can be practiced using other variations of a cylindrical or substantially cylindrical bore.

Adjacent the walls defining the bore, there is a lower bushing 22 and an upper bushing 24. The upper bushing 24 is bolted to an upper bushing retainer 26. The upper bushing retainer 26 is bolted to the mass block 20. The lower bushing 22 is bolted to a lower bushing retainer 28. The lower bushing retainer 28 is bolted to the mass block 20. A plurality of bolts 29 connects the upper bushing 24 to a removable bore liner 30. Those of ordinary skill in the art will appreciate that the bushings can be connected to the mass block directly or indirectly through intermediary elements. The removable bore liner 30 is fixed axially when the hydraulic actuator is in use. Preferably, the removable bore liner 30 is also fixed radially. When not in use, the removable bore liner 30 is readily removable from the hydraulic actuator bore 20. The interior surface of the removable bore liner 30 defines a substantially cylindrical chamber wall 31. The lower bushing 22 defines the lower end of the chamber 32, and the upper bushing 24 defines, in part, the upper end of the chamber 33 while the removable bore liner shoulder 34 completes the definition of the upper end of the chamber 33.

A piston 35 is centrally located in the chamber 36 defined by the upper bushing 24 and the lower bushing 22 and the removable bore liner 30. The piston 35 divides the chamber into an upper compartment and a lower compartment. The piston 35 sealingly engages the substantially smooth chamber wall 31 through a plurality of expandable rings 37. Those of ordinary skill in the art will recognize that the shape and finish of the chamber wall 31 must promote sealing engagement with the piston 35. In the preferred embodiment, the removable bore liner 30 is fabricated from an alloy steel (e.g., ANSI 43XX) and heat treated to obtain a Rockwell hardness of between about 34 and 38 HRC. It is preferred that the chamber wall 31 (and the removable bore liner 30, generally) be harder than the expandable rings 37. It will be appreciated that the removable liner 30 may be cast, however, it is preferred that the liner 30 be machined from wrought stock.

In the preferred embodiment illustrated in FIG. 2, the removal of the bore liner 30 is facilitated by a clearance fit between the liner 30 and the bore 21. For example, a bore 21 having an inside diameter of between 6.500 and 6.502 inches will preferably utilize a removable bore liner 30 having an outside diameter of between 6.496 and 6.498 inches.

The piston 35 is connected to an upper rod 38 and a lower rod 39. The upper rod 38 passes through the upper bushing 24. The lower rod 39 passes through the lower bushing 22. A base plate 18 is attached to the lower end of the lower rod 39. Moreover, the present invention contemplates use with single acting pistons or with dual acting pistons with single rods.

A lower conduit 40 passes through the mass block 20 and the removable bore liner 30 permitting fluid communication into the lower compartment. An upper conduit 42 passes through the mass block 20 and the removable bore liner 30 permitting fluid communication into the upper compartment. The upper and lower conduits 42 and 40 are connected to a controllable hydraulic pressure source (not shown) of the type well known in the art. In operation: pressurized fluid passes through the upper conduit 42 into the upper compartment driving the piston 35 downward relative to the mass block 20, expelling fluid from the lower compartment through the lower conduit 40; pressurized fluid is then passed through the lower conduit 40 into the lower compartment which drives the piston 35 upward relative to the mass block 20, expelling fluid from the upper compartment through the upper conduit 42.

In the preferred embodiment, a plurality of bolts 29 prevents rotation of the removable bore liner 30 about the longitudinal axis; thereby assuring alignment of the upper conduit 42, lower conduit 40, and apertures (not shown) in the removable bore liner 30 allowing for fluid communication to the upper compartment and the lower compartment.

It will be appreciated by those of ordinary skill in the art that the fluid conduits 40 and 42 do not have to pass through the mass block 20. Other arrangements, such as a fluid conduit passing through the upper or lower bushings, or a fluid conduit passing through the piston rod, can be used with the present invention.

During operation some pressurized fluid may pass between the upper bushing 24 and the upper rod 38 and the upper bushing 24 and the mass block 20 and between the lower bushing 22 and the lower rod 39 and the lower bushing 22 and the mass block 20. Therefore, a first bleed-off conduit 44 and a second bleed-off conduit 45 are provided to return the fluid passing between these surfaces to the hydraulic fluid pool. To reach the first bleed-off conduit 44 along the interface of the mass block 20 and the lower bushing 22, pressurized fluid must pass through a first "O" ring 46 and a second "O" ring 48 between the mass block 20 and the lower bushing 22. Fluid movement to the exterior is prevented by a third "O" ring 50. Before the fluid can reach the exterior of the mass block 20 along the interface of the lower rod 39 and the lower bushing 22, it must pass through a pressure seal 52 and a wiper ring 54. Before passing through the pressure seal 52 and wiper ring 54, the fluid will pass down the first bleed-off conduit 44 and return to the hydraulic fluid pool. Similar "O" rings and seals are associated with the second bleed-off conduit 45.

Figure 3:
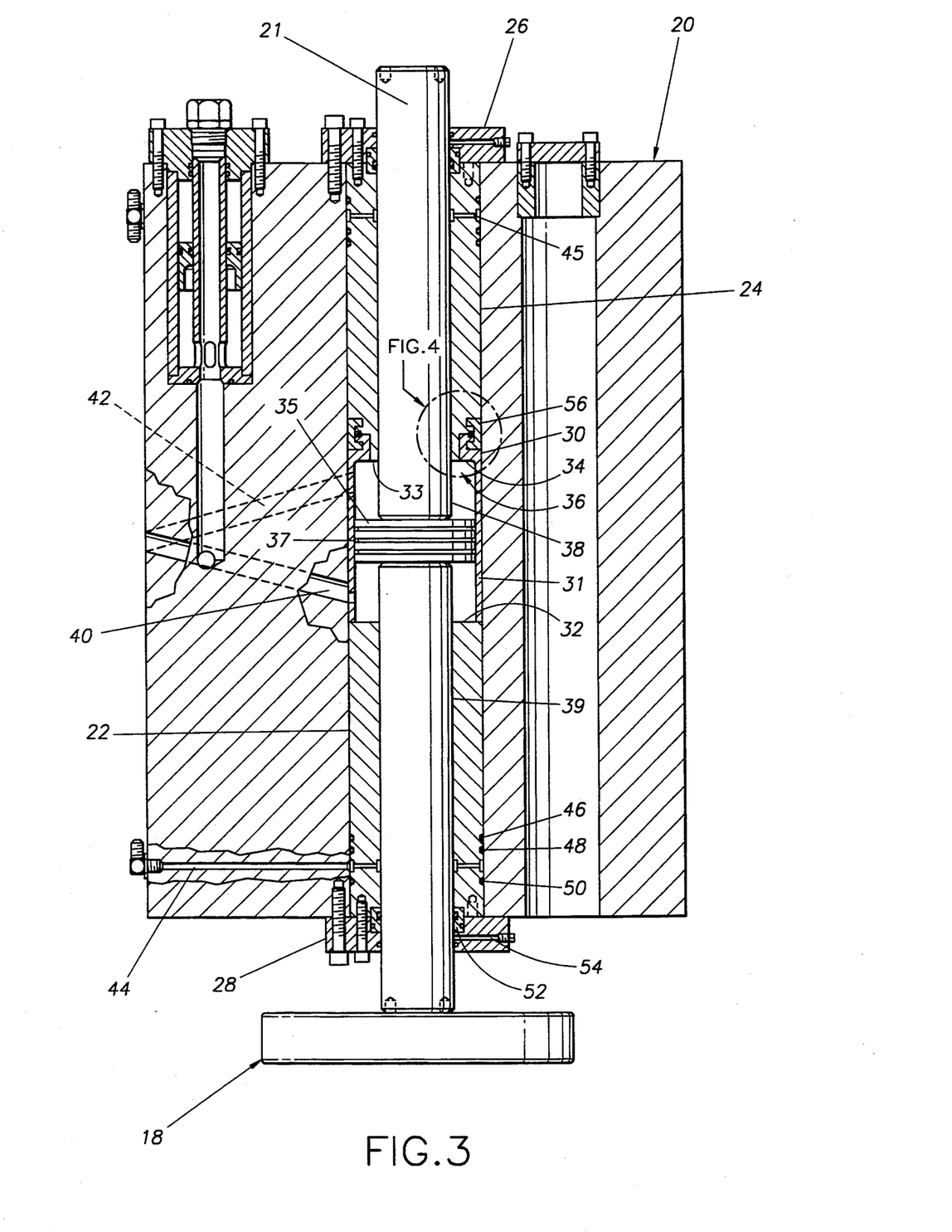
FIG. 3 is an elevational view in cross section of a hydraulic actuator with an alternative piston bore liner according to the present invention.
Figure 4:
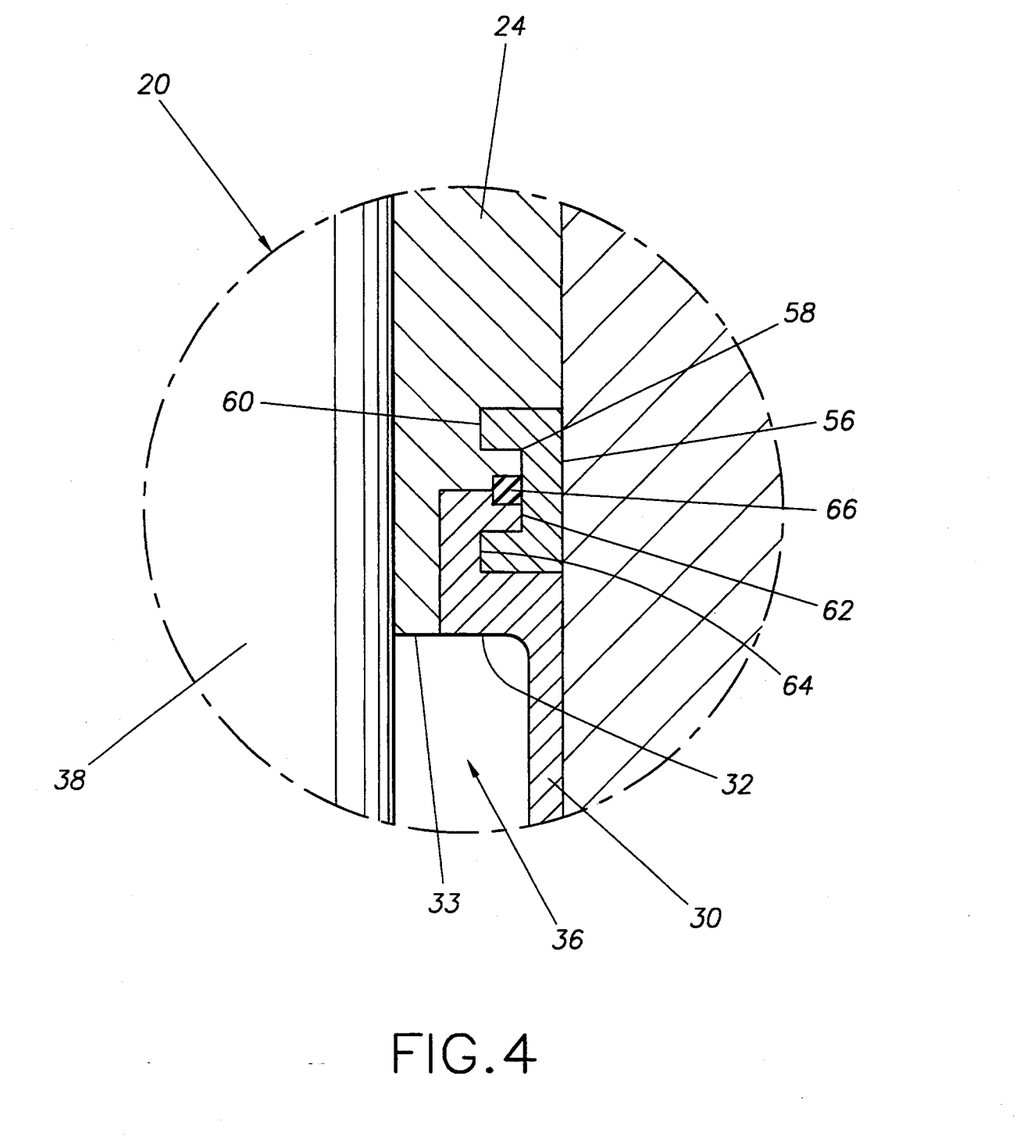
FIG. 4 is an enlarged elevational view in cross section of the split ring engaging the replaceable liner and the upper bushing of the hydraulic actuator of FIG. 3.

In the alternative preferred embodiment shown in FIG. 3, a split retainer ring 56 is used to connect the removable bore liner 30 to the upper bushing 24. As more fully illustrated in FIG. 4, the lower portion of the exterior surface of the upper bushing 24 has a reduced diameter to accommodate the inward extension of the removable bore liner 30. Upward from this reduced diameter, an upper bushing lip 58 is created by increasing the exterior diameter of the upper bushing 24 for a short vertical distance and then decreasing the diameter of the upper bushing 24 to create an upper bushing groove 60. Upward of the upper bushing groove 60, the upper bushing 24 extends to its full exterior diameter. The removable bore liner 30 extends inward above the top of the upper compartment creating the removable bore liner shoulder 32 of the upper compartment and a portion of the upper surface of the chamber. After remaining constant for a short vertical distance, the removable bore liner's 30 exterior diameter is decreased for a short vertical distance. The removable bore liner's 30 exterior diameter is then increased to less than the bore 21 diameter the short vertical distance to the end of the liner, creating a removable bore liner lip 62 and a removable bore liner groove 64. The split retainer ring 56 engages the upper bushing groove 60 and the removable bore liner groove 64 connecting the upper bushing 24 to the removable bore liner 30. The split retainer ring 56 is held in place by the mass block 20.

In the alternative preferred embodiment illustrated in FIG. 3, axial rotation of the removable bore liner 30 is prevented by creating a key-way at an intersection of the upper bushing lip 58, the removable bore liner lip 62, and the split retainer ring 56 and inserting a key 66 therein. The key 66 prevents the removable bore liner 30 from rotating out of alignment with the upper conduit 42 and the lower conduit 40. In the preferred embodiment of FIG. 2 (and the alternative preferred embodiment of FIG. 3), the removable bore liner 30 is connected to the mass block 20 through the upper bushing 24. It will be appreciated by those of ordinary skill in the art having benefit of this disclosure that there are numerous ways of connecting the removable bore liner 30 to either the upper or lower bushing. Indeed, it is possible to connect the removable bore liner to both bushings using conventional fastening structures. Moreover, the present invention contemplates connecting the removable bore liner 30 directly to the bore 21 itself. For example, the mass block 20 can be provided with access holes (not shown) for engaging set screws into the removable bore liner 30. Further, it will also be appreciated that the removable bore liner 30 can freely rotate about the longitudinal axis so long as fluid communication is maintained between the upper compartment and the upper conduit 42 and the lower compartment and the lower conduit 40.

The present invention may also be practiced without attaching the removable bore liner 30 to the upper bushing 24, lower bushing 22 or to the mass block 20. The removable bore liner 30 can be held against either the upper bushing 24, the lower bushing 22 or the bore 21 by hydraulic pressure. Alternatively, the upper bushing 24 and the lower bushing 22 can compressively engage the removable bore liner 30, thereby securing the removable bore liner 30 in the proper spatial relationship to the mass block 20.

The present invention also facilitates a method of assembling a seismic vibrator. In the preferred embodiment, the removable bore liner 30 is connected to the upper bushing 24 with a plurality of bolts 29. The lower bushing 22 is inserted into the lower portion of the bore 21 and is connected to the lower bushing retainer 28 which is connected to the mass block 20. The piston 35 is inserted into the removable bore liner 30 and the upper rod 38 is inserted into the upper bushing 24. This assembly is then inserted into the bore 21 as the lower rod 39 is guided into the lower bushing 22. The upper bushing 24 is connected to the upper bushing retainer 26 which is connected to the mass block 20.

One of ordinary skill in the art will recognize many variations to the described method of assembly. For example, the liner can be adapted to pilot itself around a piston without using ring compression tools. A self-piloting removable bore liner of this type may be inserted into the bore after insertion of the piston into the bore.

Also, removable bore liner replacement can be effectuated without complete disassembly of the hydraulic actuator. For example, a removable bore liner could be replaced with a self-piloting removable bore liner by removing the upper bushing retainer 26 and the upper bushing 24 with the connected removable bore liner 30. In this embodiment, assembly only requires connection of the self-piloting removable bore liner 30 to the upper bushing 24, insertion of the upper bushing 24 and connected self-piloting removable bore liner 30 into the bore 21 and connecting the upper bushing retainer 26 to the upper bushing 24 and to the mass block 20.

The invention also permits field modification of the force generated by a seismic vibrator. Force modification is accomplished by replacing the piston and removable bore liner with a piston and removable bore liner of differing diameter. The invention also facilitates modification of the bulk modulus of elasticity of a seismic vibrator. Bulk modulus of elasticity modification is effectuated by changing the volume of fluid driving the piston. The volume of fluid driving the piston can be changed in a variety of ways. The diameter of the piston and removable bore liner can be change. Alternatively, the length of the removable bore liner can be changed. If the length of the liner is change, the aggregate length of the upper bushing, removable bore liner and lower bushing must remain substantially the same. Therefore, if the removable bore liner length is changed, the upper and lower bushings must be replaced with bushings of an appropriate length or spacer bushings may be used. Alternatively, the upper and lower bushing retainers may be replaced with bushing retainers that protrude into the bore or that are recessed, allowing the upper and lower bushings to protrude into the bushing retainer.

The foregoing description is directed to particular embodiments of the invention for the purpose of illustration and explanation. It will be apparent, however, to one of ordinary skill in the art that many modifications and changes to the embodiments set forth above are possible without departing from the scope and spirit of the invention. It is intended that the following claims be interpreted to embrace all such modifications and changes.

What is claimed is:

1. A hydraulic actuator, comprising:
   an actuator body having a substantially cylindrical wall therein defining a bore;
   a removable, tubular liner located adjacent said cylinder wall, said liner having a substantially smooth inside diameter surface forming a wall of a chamber;
   a conduit providing communication of pressurized fluid into said chamber;
   a substantially cylindrical piston located in said chamber and adapted for sealing engagement with the substantially smooth inside diameter surface of said removable liner, said piston capable of relative axial movement within said chamber in response to differential pressurization of said chamber;
   a first bushing having a circumferential groove at an end proximal said removable liner;
   said removable liner having a circumferential groove at an end proximal said first bushing; and
   a split retainer ring engaging the circumferential groove in said first bushing and said circumferential groove in said removable liner for fixedly maintaining a spatial relationship of said liner and said first bushing.

2. The hydraulic actuator of claim 1, wherein
   said first bushing provides a substantially fluid tight seal with said removable liner and between said first bushing and a first rod associated with said piston, said first bushing connected to said actuator body.

3. The hydraulic actuator of claim 1 further comprising:
   a shear-resistant material inserted into a keyway formed at an interface of said first bushing and said removable liner for preventing axial rotation of the removable liner relative to said bore.

4. The hydraulic actuator of claim 1 wherein:
   said hydraulic actuator body is a mass block.

5. A hydraulic actuator, comprising:
   an actuator body having a substantially cylindrical wall therein defining a bore;
   a removable, tubular liner located adjacent said cylinder wall, said liner having a substantially smooth inside diameter surface forming a wall of a chamber;
   a conduit providing communication of pressurized fluid into said chamber;
   a substantially cylindrical piston located in said chamber and adapted for sealing engagement with the substantially smooth inside diameter surface of said removable liner, said piston capable of relative axial movement within said chamber in response to differential pressurization of said chamber;
   a first bushing providing a substantially fluid tight seal with said removable liner and between said first bushing and a first rod associated with said piston, said first bushing connected to said actuator body; and
   a plurality of threaded fasteners connecting said removable liner to said first bushing.

6. The hydraulic actuator of claim 5 further comprising:
   a second bushing providing a substantially fluid tight seal with said removable liner and between said second bushing and a second rod associated with said piston, said second bushing connected to said actuator body.

7. The hydraulic actuator of claim 5 wherein:
   said hydraulic actuator body is a mass block.

8. A vibrator assembly forming a part of a seismic vibrator for imparting seismic energy into a geologic formation, comprising:
   a mass block having a substantially cylindrical wall therein defining a bore therethrough;
   a first bushing having a cylindrical outer wall of a diameter slightly smaller than said bore of said mass block, said first bushing having a first end adapted to be fixedly connected to said mass block, said first bushing having a cylindrical wall therein defining a bore therethrough;
   a second bushing having a cylindrical outer wall of a diameter slightly smaller than said bore of said mass block, said second bushing having a first end adapted to be fixedly connected to said mass block, said second bushing having a cylindrical wall therein defining a bore therethrough, said second bushing having a circumferential groove at a second end, and proximal said removable liner;

a removable, tubular liner located adjacent said bore of said mass block and between a second end of said first bushing and a second end of said second bushing, said liner having a substantially smooth inside diameter surface defining a chamber wall and said second ends of said first and said second bushings substantially defining ends of said chamber, said removable liner having a circumferential groove at an end proximal said second bushing;

a piston located in said chamber in fluid tight engagement with said substantially smooth inside diameter surface, said piston having a first rod passing through said bore of said first bushing and a second rod passing through said bore of said second bushing in substantially fluid tight arrangement, said piston dividing said chamber into at least two fluid compartments;

a split retainer ring engaging the circumferential groove in said second bushing and said circumferential groove in said removable liner for fixedly maintaining a spatial relationship of said liner and said second bushing; and a fluid conduit for communicating pressurized fluid into said compartments thereby differentially pressurizing one of said compartments with respect to said other compartment.

9. A method of assembling a hydraulic actuator of a seismic vibrator, comprising the steps of:

providing a hydraulic actuator body having a cylindrical wall therein defining a bore;

assembling a removable, tubular bore liner around a piston in fluid tight arrangement thereby forming a liner/piston assembly;

attaching a first bushing to said removable liner to form a bushing/liner/piston assembly, such that a first end of said first bushing is adjacent a first end of said removable liner, a first rod associated with said piston extending through said first bushing;

placing said bushing/liner/piston assembly in said bore; and connecting said first bushing to said hydraulic actuator body.

10. The method of claim 9 further comprising the steps of:

assembling a second bushing in said bore such that a first end of said second bushing is adjacent a second end of said removable liner, a second rod associated with said piston extending through said second bushing;

fixing said second bushing to said hydraulic actuator body.

* * * * *

UNITED STATES PATENT AND TRADEMARK OFFICE
CERTIFICATE OF CORRECTION

PATENT NO. : 5,401,919
DATED : March 28, 1995
INVENTOR(S) : John M. Crowell et al It is certified that error appears in the above-indentified patent and that said Letters Patent is hereby corrected as shown below:

Column 1, line 34, after the second occurrence of the word "the," add --dependability,--.

Column 4, line 53, change "east" to --cast--.

Column 10, claim 9, line 8, change "attaching" to --connecting--.

Signed and Sealed this

Twenty-fifth Day of July, 1995

Attest:

BRUCE LEHMAN

Attesting Officer

Commissioner of Patents and Trademarks